United States Patent
Stachura et al.

(10) Patent No.: US 8,276,978 B2
(45) Date of Patent: Oct. 2, 2012

(54) SUBSTRATES FOR VEHICLE INSTRUMENT PANELS AND VEHICLE INSTRUMENT PANELS INCORPORATING THE SAME

(75) Inventors: Jan-Michael Francis Stachura, Milan, MI (US); Warren Jing-Po Chou, Ann Arbor, MI (US); Daniel Brian Gidcumb, Jr., Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 621 days.

(21) Appl. No.: 12/427,220

(22) Filed: Apr. 21, 2009

(65) Prior Publication Data
US 2010/0264698 A1   Oct. 21, 2010

(51) Int. Cl.
B60R 13/00   (2006.01)
B62D 25/14   (2006.01)

(52) U.S. Cl. .......................................... 296/191; 296/70
(58) Field of Classification Search ............... 296/70, 296/1.08, 39.1, 191, 39.3, 146.7; 52/309.4; 428/57, 58, 309.9
See application file for complete search history.

(56) References Cited

U.S. PATENT DOCUMENTS

| | | | |
|---|---|---|---|
| 4,779,390 A | 10/1988 | Repper et al. | |
| 5,997,076 A | 12/1999 | Ehrlich | |
| 6,601,909 B2 | 8/2003 | Obara et al. | |
| 6,635,328 B2 | 10/2003 | Shimabara et al. | |
| 7,100,958 B2 * | 9/2006 | Ory | 296/70 |
| 7,332,207 B2 | 2/2008 | Bondar et al. | |
| 2002/0153741 A1 * | 10/2002 | Speelman et al. | 296/70 |
| 2004/0140692 A1 | 7/2004 | Grimm et al. | |
| 2004/0229013 A1 | 11/2004 | Dooley et al. | |
| 2005/0248176 A1 | 11/2005 | Ory | |
| 2005/0253409 A1 | 11/2005 | Sato et al. | |
| 2006/0157881 A1 | 7/2006 | Grabowski | |
| 2006/0237988 A1 | 10/2006 | Niimi | |
| 2007/0018472 A1 | 1/2007 | Michalski et al. | |
| 2007/0029829 A1 | 2/2007 | Johnson et al. | |
| 2007/0035071 A1 | 2/2007 | Smith et al. | |
| 2008/0107889 A1 | 5/2008 | Fox | |
| 2008/0209955 A1 | 9/2008 | Cassaro et al. | |
| 2008/0229697 A1 | 9/2008 | Bosman et al. | |

OTHER PUBLICATIONS

Office Action mailed Jul. 7, 2011 as it relates to U.S. Appl. No. 12/427,143.
Notice of Allowance and Allowability mailed Dec. 22, 2011 as it relates to U.S. Appl. No. 12/427,143.

* cited by examiner

Primary Examiner — Glenn Dayoan
Assistant Examiner — Melissa Black
(74) Attorney, Agent, or Firm — Dinsmore & Shohl LLP

(57) ABSTRACT

An interior finish panel for a vehicle may include a panel substrate, at least two pieces of skin disposed over the panel substrate, and a foam layer. The panel substrate may include an inclined portion disposed between a base portion and at least one sealing surface. The at least two pieces of skin may include an upper skin and a lower skin joined together at a seam, wherein the seam may be at least partially disposed over the inclined portion. The seam may be sealed to a vertex of the inclined portion between the inclined portion and the sealing surface. The foam layer may be disposed between the at least two pieces of skin and the panel substrate. The foam layer may taper from the base portion towards the vertex of the inclined portion and terminate along the inclined portion before the vertex of the inclined portion.

19 Claims, 7 Drawing Sheets

SUBSTRATES FOR VEHICLE INSTRUMENT PANELS AND VEHICLE INSTRUMENT PANELS INCORPORATING THE SAME

CROSS REFERENCE TO RELATED APPLICATIONS

This application is related to U.S. Non-Provisional application Ser. No. 12/427,143 filed on Apr. 21, 2009 and entitled "Panel Substrates For Vehicle Finish Panels And Vehicle Finish Panels Incorporating The Same".

TECHNICAL FIELD

The present invention generally relates to finish panels for vehicles and, more specifically, to substrates for vehicle finish panels.

BACKGROUND

Vehicles may contain finish panels which are located in front of the driver and passenger seats, as well as on doors and other locations throughout the interior of the vehicle. The finish panels typically include a substrate, a skin layer, and a foam layer. The substrate may be formed from a rigid material, such as metal or rigid plastic. The skin layer, which may include a polymeric material or a natural material, such as leather, may be positioned over the substrate and foam may be injected between the substrate and the skin layer to provide the finish panel with structure. The foam may also bond the skin layer to the substrate.

The finish panels may be formed by positioning the substrate and skin layer in a mold such that the skin layer is disposed over the substrate. The mold is then closed and foam is injected between the skin layer and the substrate. In order to prevent the foam from leaking out between the substrate and the skin layer, the skin layer may be sealed to the substrate, particularly around the edges of the substrate. The seal between the skin layer and the substrate may be accomplished by utilizing the mold to apply a sealing pressure to the skin layer thereby forcing the skin against the substrate.

Some finish panels may include two or more pieces of skin, such as when different skin materials are used to cover the substrate or when different colors of the same material are used to cover the substrate. Where two or more pieces of skin are used to form the skin layer, the skin may be joined together to form a continuous skin layer. One problem that arises when using a skin layer comprising two or more pieces of skin is adequately sealing the skin layer to the substrate in the area of the seam or joint between the pieces of skin as the finish panel is formed. If the skin is not properly sealed to the substrate, foam may leak out of the skin layer and adhere to the visible surface or A-surface of the skin layer. The leakage of foam from the skin layer leads to increased material costs. Where significant foam leakage occurs, the finish panel may be discarded.

Accordingly, a need exists for alternative substrates for finish panels that facilitate sealing a two piece skin layer to the substrate during formation of the finish panel and finish panels which incorporate the same.

SUMMARY

In one embodiment, a panel substrate for an interior finish panel of a vehicle may include a base portion, an inclined portion and at least one sealing surface. The inclined portion may be disposed between the base portion and the at least one sealing surface thereby forming a graded transition between the base portion and the at least one sealing surface such that the at least one sealing surface and the base portion are non-coplanar. The inclined portion and the at least one sealing surface may form a vertex where the inclined portion and the base portion intersect. When a skin layer is disposed over the substrate, a seam between the at least two pieces of skin may be sealed to the vertex and, when a foam layer is disposed between the skin layer and the panel substrate, the foam layer may taper between the base portion and the vertex.

In another embodiment, an interior finish panel for a vehicle may include a panel substrate, at least two pieces of skin disposed over the panel substrate, and a foam layer. The panel substrate may include an inclined portion disposed between a base portion and at least one sealing surface. The at least two pieces of skin may include an upper skin and a lower skin joined together at a seam, wherein the seam may be at least partially disposed over the inclined portion. The seam may be sealed to a vertex of the inclined portion between the inclined portion and the sealing surface. The foam layer may be disposed between the at least two pieces of skin and the panel substrate. The foam layer may taper from the base portion towards the vertex of the inclined portion and terminate along the inclined portion before the vertex of the inclined portion.

In yet another embodiment, a method for forming an interior finish panel for a vehicle comprising a panel substrate, at least two pieces of skin disposed over the panel substrate, and a foam layer positioned between the panel substrate and the at least two pieces of skin includes providing a panel substrate comprising an inclined portion positioned between a base portion and at least one sealing surface and a first piece of skin and a second piece of skin having a seam disposed between the first piece of skin and the second piece of skin. The panel substrate may be positioned in a first mold half and the first piece of skin and the second piece of skin may be positioned in a second mold half. The first mold half and the second mold half may be engaged with one another such that the first skin and the second skin are disposed over the substrate and at least a portion of the seam is positioned over the inclined portion of the panel substrate and the first skin and second skin are sealed to a vertex of the inclined portion in the area of the seam. A foaming material is then injected between the substrate and the first skin and second skin to form the foam layer.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Figure 3:
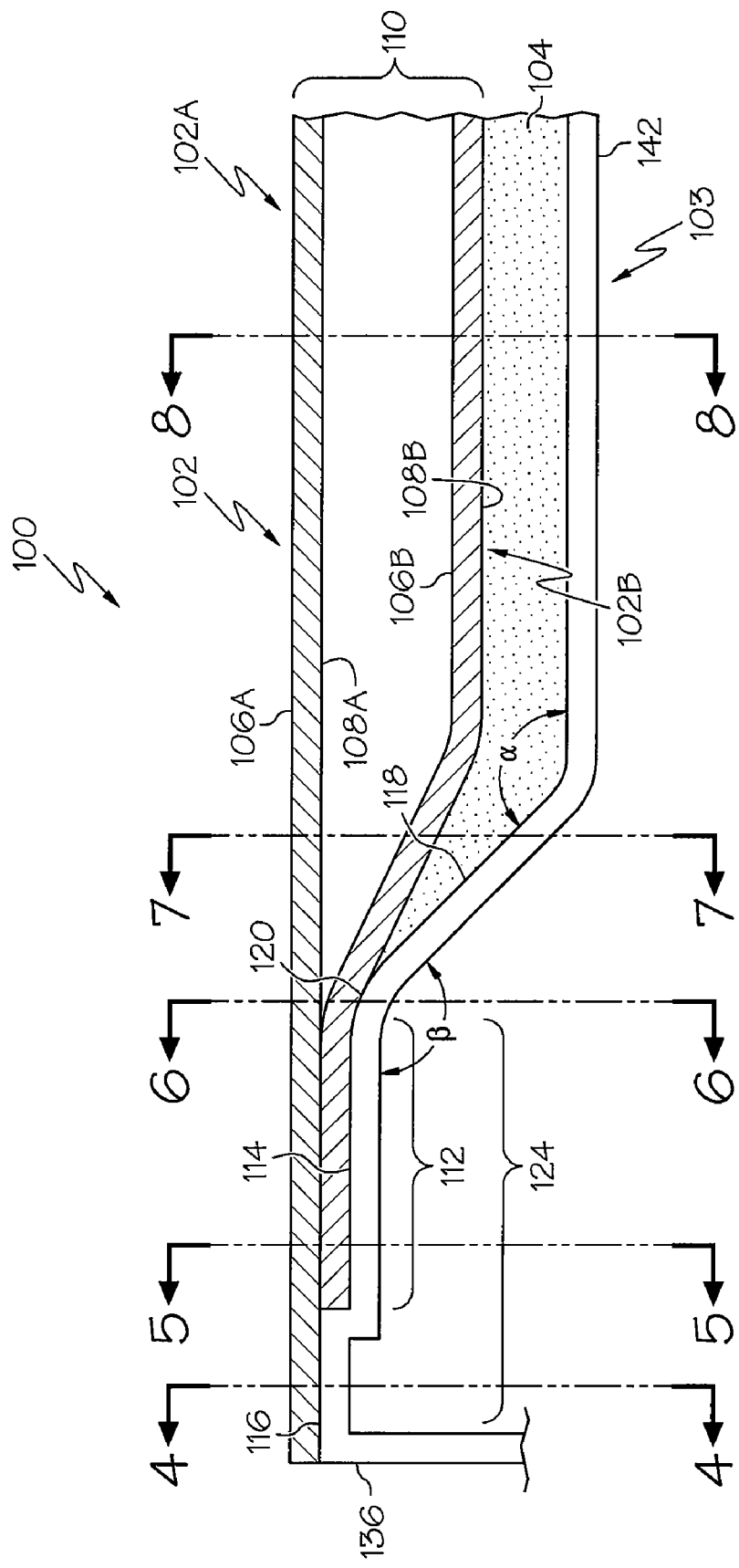
FIG. 3 depicts a partial cross section of the interior finish panel of FIG. 1 in the area indicated in FIG. 1 according to one or more embodiments shown and described herein.

FIG. 3 generally depicts a partial cross section of an interior finish panel of a vehicle according to one or more embodiments described herein. The interior finish panel generally comprises a panel substrate, a foam layer, an upper skin, and a lower skin. The panel substrate may include at least one inclined portion connecting the base of the panel substrate to a sealing surface of the panel substrate. The upper skin and lower skin may be disposed over the panel substrate and may be joined in a skin lock which is disposed in a skin lock channel along the inclined portion. The upper and lower skin may transition out of the skin lock along the inclined portion of the panel substrate and form an overlap seam which is sealed to the panel substrate along the inclined portion thereby reducing foam flow to the sealing surface as foam is injected between the panel substrate and the upper and lower skins. The panel substrate, finish panel and methods of forming the finish panel will be described in more detail herein.

Figure 1:
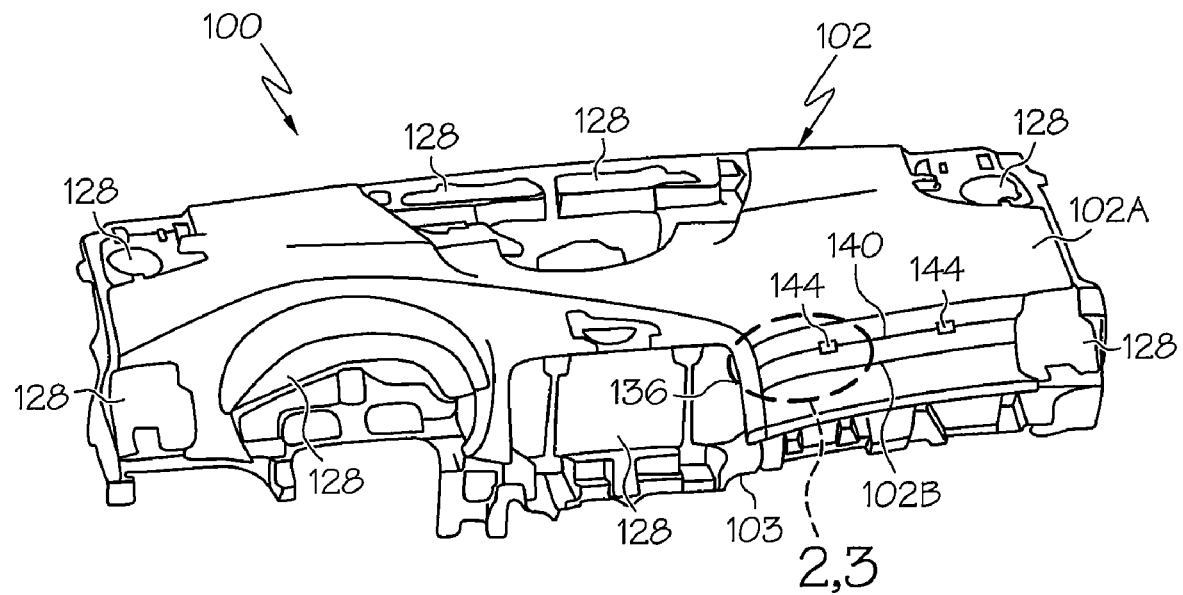
FIG. 1 depicts an interior finish panel for a vehicle according to one or more embodiments shown and described herein.

Referring now to FIG. 1, one embodiment of a finish panel 100 for a vehicle is schematically illustrated. In the embodiment shown in FIG. 1 the finish panel 100 is a front instrument panel (IP) of a vehicle which may be located in front of the passenger and driver seats of the vehicle. The finish panel 100 may generally comprise a panel substrate 103 over which a skin layer 102 may be disposed. In the embodiments shown and described herein, the skin layer comprises two pieces of skin: upper skin 102A and lower skin 102B. The finish panel 100 may further comprise a foam layer (not shown) disposed between the skin layer 102 and the panel substrate to provide the finish panel 100 with the desired form and appearance. Further, the foam layer may also impart the finish panel 100 with some elasticity or resiliency such that the finish panel 100 is a "soft" finish panel. Where the finish panel 100 is an instrument panel, as shown in FIG. 1, or where the finish panel is designed to receive additional vehicle components or accessories such as, for example, gages, HVAC components, speakers, radios, navigational equipment and the like, the finish panel 100 may comprise a plurality of openings 128 for receiving such components and accessories. Accordingly, the panel substrate may be formed with various openings 128 and/or attachments points by which such components and accessories may be attached to the finish panel 100. In addition, the finish panel 100 may comprise one or more receptacles 144 for receiving connectors for attaching additional trim panels or finish accents to the finish panel 100.

While the embodiments of the finish panel 100 are shown and described herein as comprising a front instrument panel, it should be understood that the finish panel 100 may comprise various other types of finish panels which may be located throughout the vehicle. For example, the finish panel 100 may be a door panel, a console panel or other, similar finish panel located on the interior of the vehicle and which comprises a panel substrate, at least two pieces of skin, and a foam layer disposed between the panel substrate and the two pieces of skin.

Figure 2:
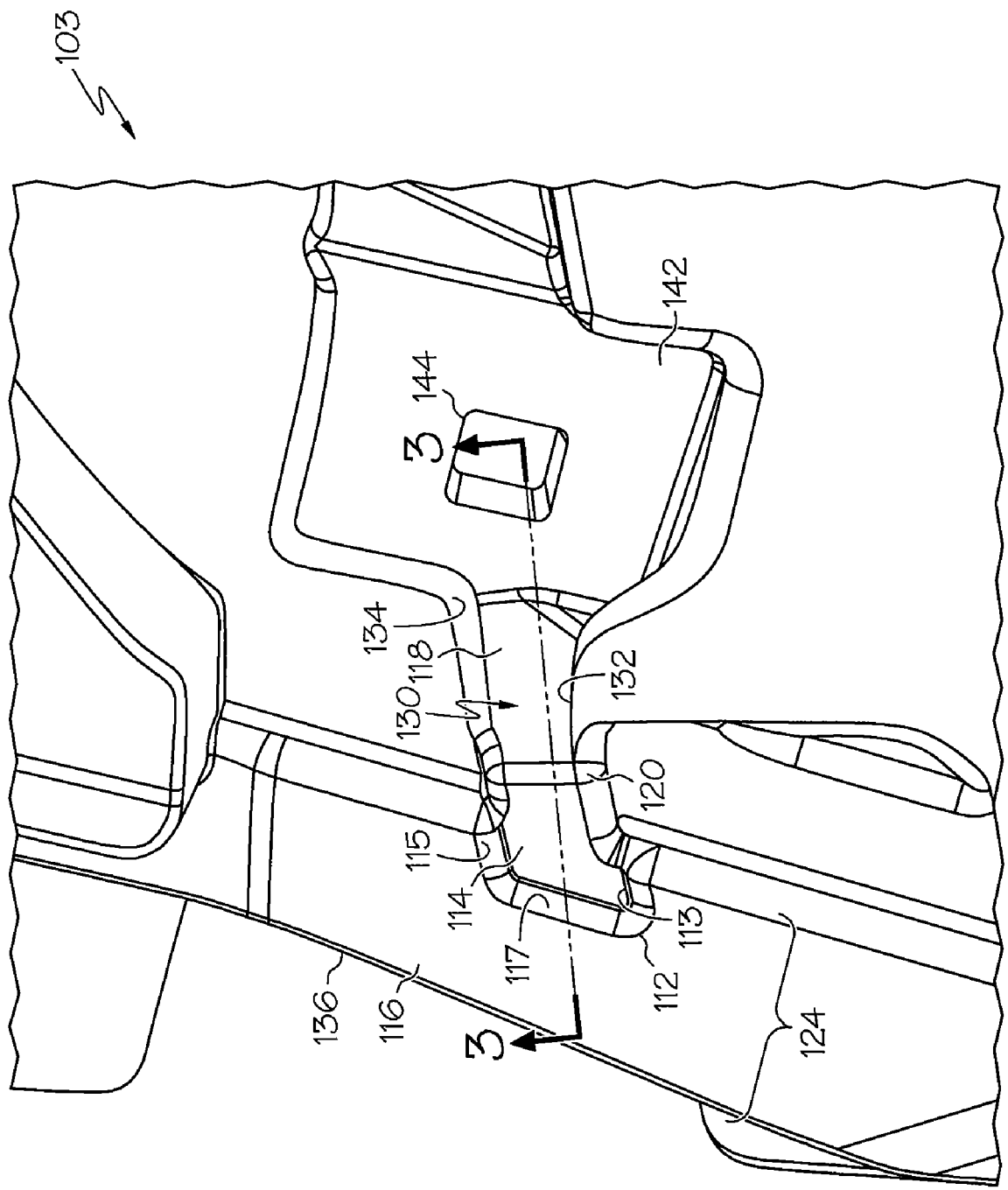
FIG. 2 depicts a portion of the substrate of the interior finish panel of FIG. 1 in the area indicated area in FIG. 1 according to one or more embodiments shown and described herein.

Referring now to FIGS. 2 and 3, the panel substrate 103 may generally comprise a rigid material such as a rigid polymer, metal, or composite material. For example, in the embodiments shown herein, the panel substrate 103 is a rigid polymeric material such as, for example, ABS plastic, polypropylene or a similar rigid polymeric material. When the panel substrate is a rigid polymeric material, the panel substrate may be formed by injection molding the polymeric material to form the desired substrate shape and features. However, it will be understood that the panel substrate 103 may comprise a metal, such as steel sheet metal, which may be stamped to produce a panel substrate 103 having the desired substrate shape and features. Alternatively, the panel substrate 103 may comprise a composite material formed through a suitable molding process to produce a panel substrate 103 having the desired substrate shape and features.

Still referring to FIGS. 2 and 3, the panel substrate 103 may comprise a base portion 142 and at least one sealing surface 124. As shown in FIGS. 2 and 3, the sealing surface 124 and the base portion 142 are oriented in the panel substrate 103 such that the base portion 142 and the sealing surface 124 are non-coplanar. For example, in the embodiment of the panel substrate 103 shown in FIG. 3, the base portion 142 and the sealing surface 124 are disposed in substantially parallel planes. Accordingly, it should be understood that, in one embodiment, the base portion 142 and the sealing surface 124 are substantially parallel. In another embodiment (not shown) the base portion 142 and the sealing surface 124 may be non-parallel in addition to being non-coplanar. For example, the base portion 142 may be disposed in a first plane and the sealing surface 124 may be disposed in a second plane which is non-parallel with the first plane.

The panel substrate 103 may further comprise an inclined portion 118 which is disposed between the base portion 142 and the sealing surface 124. The inclined portion 118 may generally form an angle $\alpha$ with the base portion 142 and an angle $\beta$ with the sealing surface 124, as shown in FIG. 3. In the embodiments shown and described herein the angle $\alpha$ may be greater than about 90 degrees. Similarly, the angle $\beta$ may also be greater than about 90 degrees. The inclined portion 118 transitions to the sealing surface 124 at the vertex 120 formed by the intersection of the inclined portion 118 and the sealing surface 124.

Referring to FIG. 2, the inclined portion 118 generally forms a graded transition between the base portion 142 and the sealing surface 124. In one embodiment, the inclined portion 118 is disposed between a pair of sidewalls 132, 134, as shown in FIG. 2. In this embodiment, the inclined portion 118 and sidewalls 132, 134 form a channel 130 as shown in FIG. 2. The channel 130 extends from the base portion 142 in a direction towards the sealing surface 124 and terminates below the vertex 120 between the inclined portion 118 and the sealing surface 124. As will be described in more detail herein, the channel 130 is operable to receive a skin lock 110 formed between the upper skin 102A and the lower skin 102B. In addition, the inclined portion 118 is also operable to reduce the amount of foam which flows to the B-surface of the upper and lower skins 102A, 102B and the sealing surface 124 of the panel substrate 103 during formation of a finish panel incorporating the panel substrate 103.

The sealing surface 124 may extend between the inclined portion 118 and an edge 136 of the panel substrate 103. The edge 136 may be an interior edge of the panel substrate (e.g., the edge 136 is located next to a receptacle formed in the panel substrate 103) or an exterior edge of the panel substrate (e.g., the edge 136 is the edge of the panel substrate 103). In the embodiments shown herein, the edge 136 is an interior edge.

In one embodiment (not shown), the sealing surface 124 is a substantially planar surface. However, in another embodiment, the sealing surface 124 may comprise multiple surfaces which are non-coplanar. For example, in the embodiments shown in FIGS. 2 and 3, the sealing surface 124 comprises an upper sealing surface 116 and a lower sealing surface 114. The upper sealing surface 116 and the lower sealing surface 114 may have a step-like orientation relative to one another such that the upper sealing surface 116 and the lower sealing surface 114 are non-coplanar. In the embodiment shown in FIG. 2, the lower sealing surface 114 is disposed in a pocket 112 formed in the upper sealing surface 116. The depth of the pocket 112 may be less than or equal to the thickness of a skin layer disposed over the panel substrate 103, as will be described in more detail herein. The pocket 112 is formed by a pair of sidewalls (e.g., a first sidewall 113 and a second sidewall 115) and the lower sealing surface 114 is disposed between the sidewalls. In one embodiment, the lower sealing surface 114 is further bounded by a third sidewall, such as back wall 117, which extends between opposed sidewalls 113, 115. As will be described in more detail herein, the pocket 112 is operable to receive an overlap seam between the upper and lower skins 102A, 102B, respectively, such that, when the upper skin and lower skin are sealed to the lower sealing surface 114, the A-surface extending between the skins 102A, 102B does not comprise an obtrusion due to the increased thickness of the overlap seam.

Referring to FIGS. 1 and 3, the finish panel 100 may comprise a skin layer 102 having at least two pieces of skin (e.g., upper skin 102A, and lower skin 102B) disposed over the substrate 103. The skin 102A, 102B may comprise natural materials, such as leather or cloth made from natural fibers, or synthetic materials, such as vinyl, PVC, elastomeric materials such as thermoplastic urethane or similar elastomeric material(s), cloth made from synthetic fibers (e.g., nylon, etc.) or similar synthetic materials. Both the upper skin 102A and the lower skin 102B may comprise the same type of material (e.g., both the upper skin 102A and the lower skin 102B are both natural materials or both synthetic materials) or combinations of both natural materials and synthetic materials (e.g., one of the upper skin 102A and the lower skin 102B is a natural material and the other is a synthetic material). Moreover, it should be understood that the upper skin 102A and the lower skin 102B may have different colors, textures, surface finishes, etc., to achieve a desired aesthetic appearance. In the embodiments described herein, each piece of skin 102A, 102B has a top or A-surface 106A, 106B, respectively (shown in FIG. 3), which is the surface of the skin visible to an occupant of the vehicle, and an underside or B-surface 108A, 108B, respectively (shown in FIG. 3), which is the surface of the skin facing the panel substrate 103.

Referring to FIG. 3, the foam layer 104 may generally be disposed between the panel substrate 103 and the skin 102A, 102B. The foam layer 104 may generally comprise a soft foam material which is injected between the skin layer(s) and the panel substrate during formation of the finish panel. For example, the foam layer 104 may be injected between the skin layer(s) and the panel substrate with a foam in place (FIP) process, a low pressure molding (LPM) process, a structural reaction injection molding (SRIM) process, a vacuum forming process, or a similar process suitable for forming a finish panel. The foam material may be any material suitable for use with the aforementioned processes. For example, in one embodiment, the foam material may be a binary material comprising a polyether blend and an isocyanate component such as, for example, methylene bisphenyl isocyanate which, when reacted with the polyether blend, produces a foam material. However, it will be understood that any suitable foam material may be used with the aforementioned processes to form the finish panels described herein.

The foam layer 104 generally extends between a base portion 142 of the panel substrate 103 and the B-Surface 108A, 108B of the skins 102A, 102B disposed over the panel substrate 103. As will be described in more detail herein, the foam layer 104 generally tapers in thickness in the direction from the base portion 142 of the panel substrate 103 towards the vertex 120 of the inclined portion 118 of the panel substrate 103 and terminates prior to reaching the vertex 120 of the inclined portion 118 where the upper skin 102A and the lower skin 102B are sealed to the vertex 120 of the inclined portion 118.

Referring to FIGS. 4-6 and 8-9, in order to form the finish panel 100, the upper skin 102A and the lower skin 102B are first joined together to form a skin layer 102 with a seam 140. The seam 140 may comprise at least one of three different types of joints and/or various combinations thereof. The types of joints between the upper skin 102A and the lower skin 102B may include an edge-on-edge seam 126, an overlap seam 129, or a skin lock 110.

Figure 4:
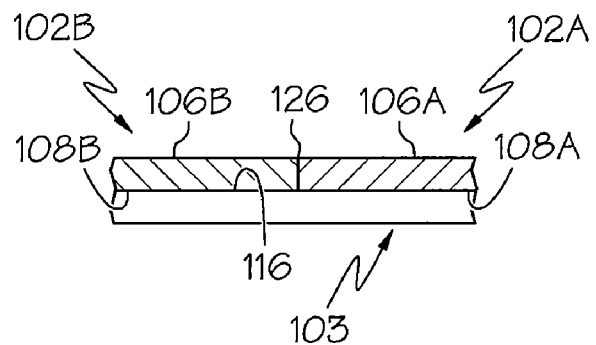
FIG. 4 depicts a cross section of the interior finish panel of FIG. 3 showing an edge-on-edge seam between the upper skin and the lower skin according to one or more embodiments shown and described herein.

Referring to FIG. 4, an edge-on-edge seam 126 is formed when an edge of the upper skin 102A and an edge of the lower skin 102B are abutted against one another without overlapping or otherwise intertwining the adjacent pieces of skin. When an edge-on-edge seam 126 is used to join adjacent pieces of skin, the skin in the area of the seam may be sealed to the upper sealing surface 116 of the substrate by applying a sealing pressure P to the A-surface 106A, 106B of each piece of skin 102A, 102B, respectively, thereby sealing the B-surface of each skin to the upper sealing surface 116 of the panel substrate 103.

Figure 5:
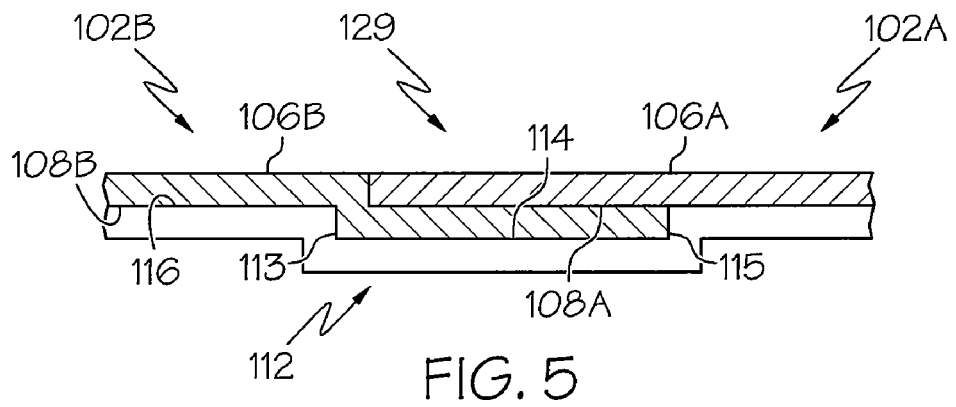
FIG. 5 depicts a partial cross section of the interior finish panel of FIG. 3 showing the lower skin disposed in a pocket in the panel substrate and the upper skin overlapping the lower skin to form an overlap seam according to one or more embodiments shown and described herein.
Figure 6:
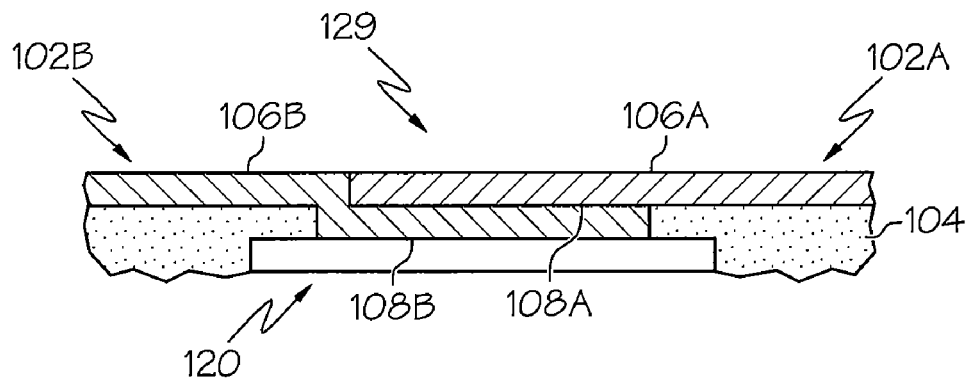
FIG. 6 depicts a partial cross section of the interior finish panel of FIG. 3 showing the upper skin overlapping the lower skin along the inclined portion of the panel substrate according to one or more embodiments shown and described herein.

Referring to FIGS. 5 and 6, an overlap seam 129 is formed by overlapping one edge of a piece of skin onto an adjacent piece of skin. For example, referring to FIG. 5, an overlap seam 129 is shown positioned in the pocket 112 in which the lower sealing surface 114 is disposed. In this embodiment, the upper skin 102A is overlapped with the lower skin 102B such that the B-surface 108A of the upper skin 102A is in contact with the A-surface 106B of the lower skin 102B. In this embodiment, the lower skin 102B is disposed on the lower sealing surface 114 in the pocket 112 such that, in the area of the overlap seam 129, the A-surface of the upper skin 102A does not contain any obtrusions which may adversely impact sealing the lower skin 102B to the upper skin 102A. FIG. 6 depicts a similar overlap seam as that shown in FIG. 5, however, in FIG. 6, the overlap seam is not disposed in the pocket 112. Instead, the overlap seam 129 is positioned on the vertex 120 of the inclined portion 118 and extends from the inclined portion 118 and on to the lower sealing surface 114. Referring to both FIGS. 5 and 6, the overlap seam 129 may be sealed to the substrate by exerting a sealing pressure P to the upper skin 102A in the area of the overlap seam 129 thereby pressing the upper skin 102A and the lower skin 102B against the surface of the substrate.

Figure 7:
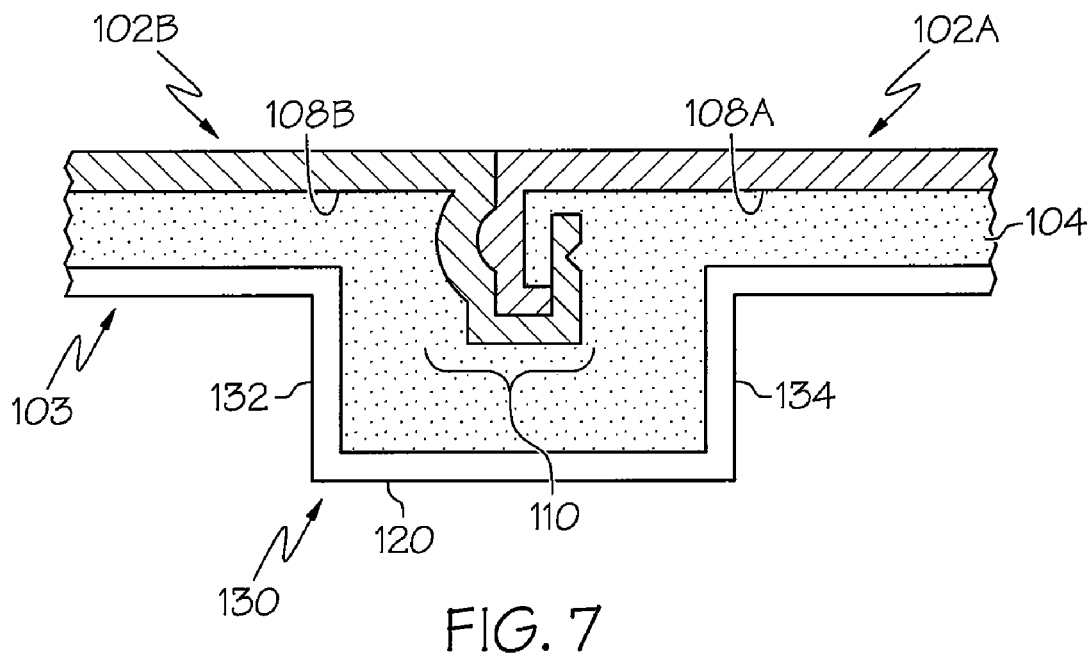
FIG. 7 depicts a partial cross section of the interior finish panel of FIG. 3 showing the upper skin and lower skin joined in a skin lock wherein the skin lock is disposed in a channel along the inclined portion of the panel substrate according to one or more embodiments shown and described herein.
Figure 8:
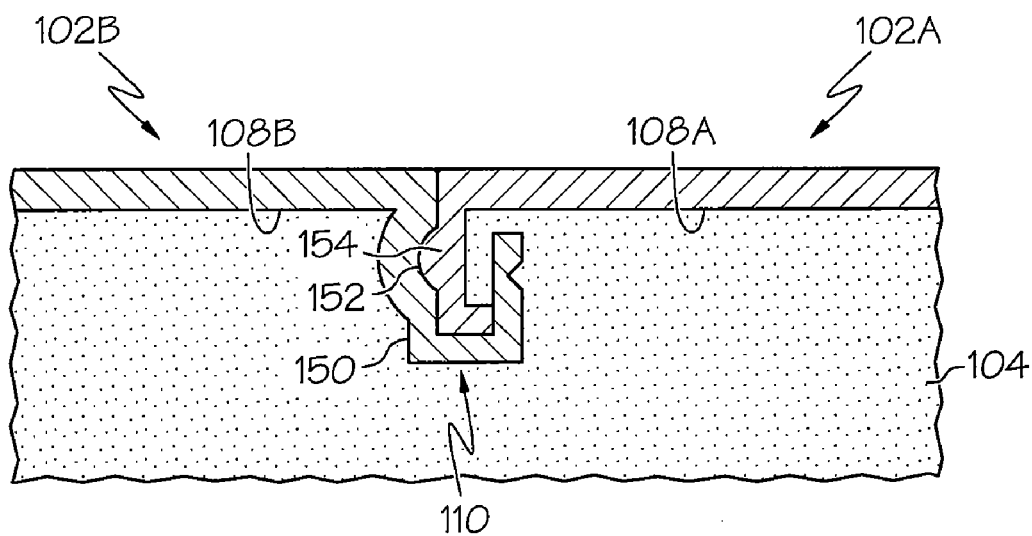
FIG. 8 depicts a partial cross section of the interior finish panel of FIG. 3 showing the upper skin and lower skin joined in a skin lock according to one or more embodiments shown and described herein.

Referring now to FIGS. 7 and 8, a skin lock 110 is formed by intertwining an edge of the upper skin 102A with an edge of the lower skin 102B such that the upper skin 102A and the lower skin 102B are joined together. While various skin lock configurations may be used, the skin lock 110 shown in FIGS. 7 and 8 utilizes a U-shaped portion 150 formed in the lower skin 102B. The U-shaped portion 150 is formed with a groove 152 for receiving a corresponding bead 154 formed in the upper skin 102A. The upper skin 102A is inserted into the U-shaped portion 150 such that the bead 154 is positioned in the groove 152. The upper skin 102A and the lower skin 102B may then be joined by pressing the respective pieced of skin together along the skin lock. In one embodiment, heat may be used as the upper skin 102A and the lower skin 102B are pressed together. Alternatively or additionally, an adhesive may be disposed in the skin lock 110 to facilitate bonding and sealing the upper skin 102A with the lower skin 102B.

Figure 9:
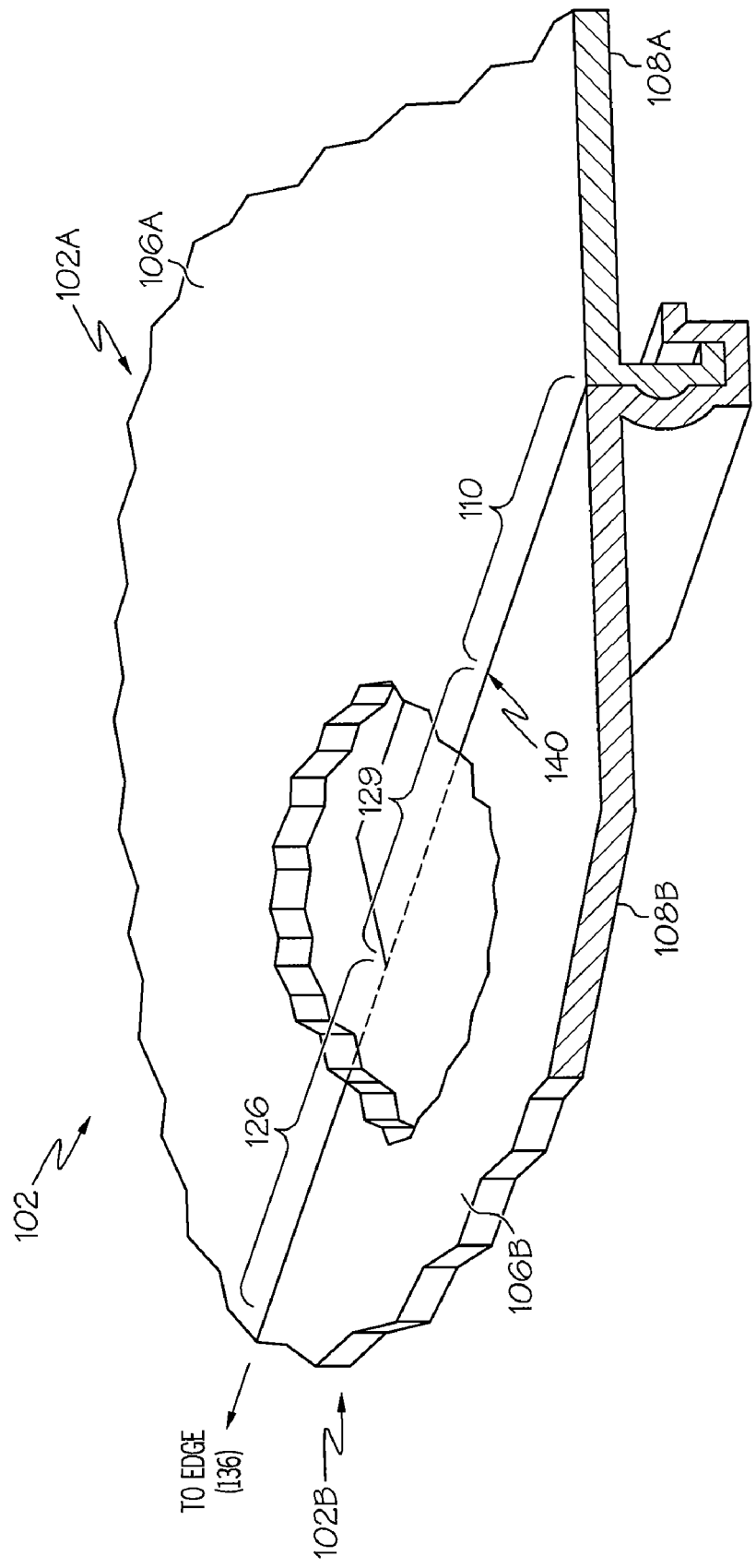
FIG. 9 depicts a portion of the seam between the upper skin and the lower skin showing a skin lock, an overlap seam and an edge-on-edge seam according to one or more embodiments shown and described herein.

Referring to FIG. 9, it should now be understood that the skin layer 102 may be formed by attaching an upper skin 102A and a lower skin 102B to form a seam disposed between the two pieces of skin using various types of seams (e.g., edge-on-edge seams, overlap seams, and/or skin locks). Further, it should be understood that a seam between two pieces of adjacent skin may comprise one or more types of seams. For example, FIG. 9 shows a portion of the skin layer 102 comprising the upper skin 102A and the lower skin 102B along the seam 140. A portion of each of the upper skin 102A and the lower skin 102B is shown cut away to reveal the types of seams utilized to join the upper skin 102A and the lower skin 102B. In this embodiment, the seam 140 comprises a skin lock 110, an overlap seam 129, and an edge-on-edge seam 126. However, it should be understood that the seam 140 may comprise various combinations of two types of seams (e.g., an edge-on-edge seam and an overlap seam, an edge-on-edge seam and a skin lock, or an overlap seam and a skin lock), or a single type of seam (e.g., an overlap seam).

Referring now to FIGS. 3-10, after joining an upper skin 102A with a lower skin 102B to form skin layer 102 as described above and shown in FIG. 9, the skin layer 102 may be disposed over the substrate and foam may be injected between the skins 102A, 102B to provide the finish panel 100 with shape, as will be described in more detail herein.

Figure 10:
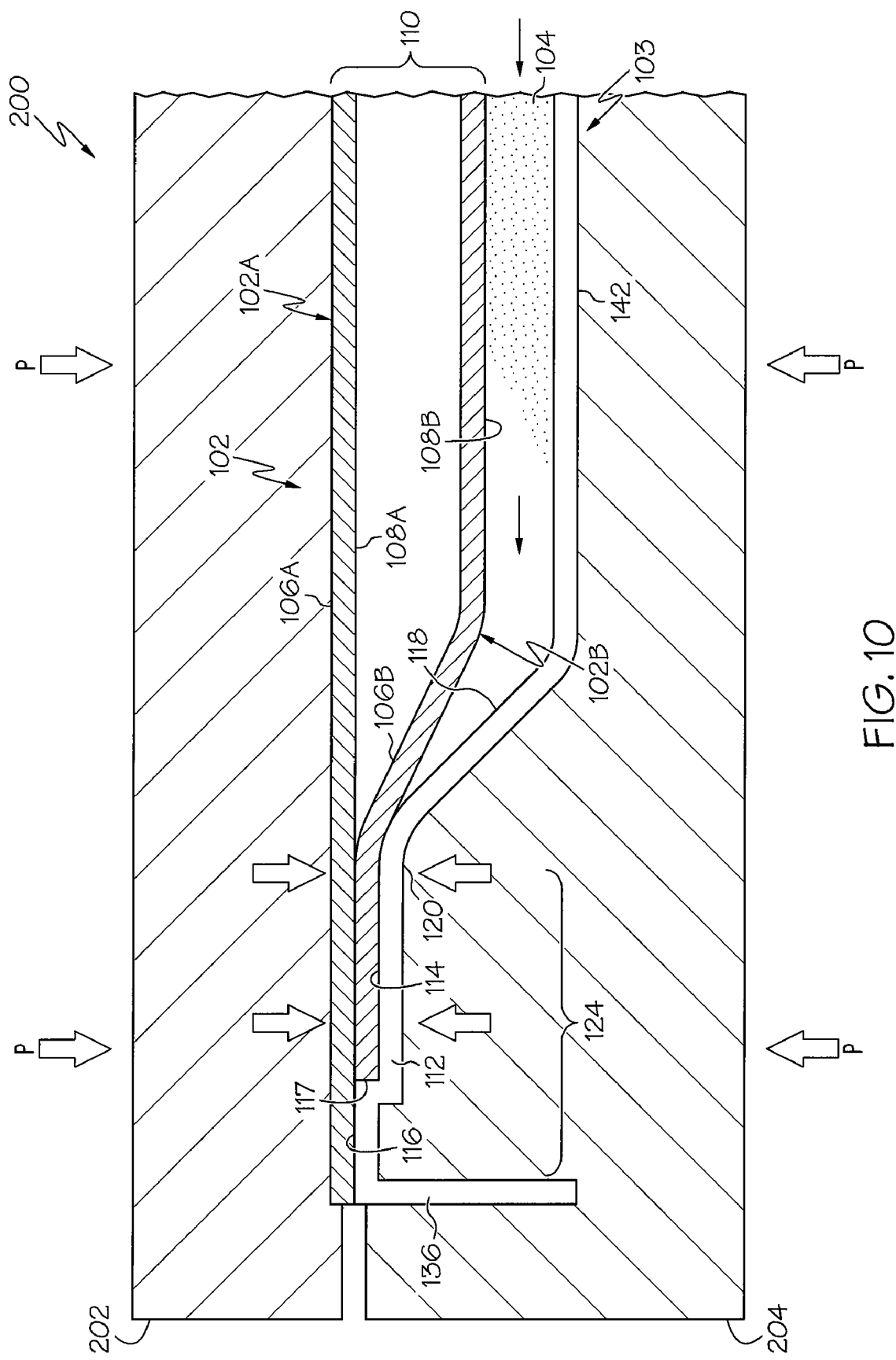
FIG. 10 depicts a cross section of a mold for forming a finish panel according to one or more embodiments shown and described herein.

Referring to FIG. 10, a partial cross section of a mold 200 is depicted which may be used to form a finish panel such as finish panel 100 shown in partial cross section in FIG. 3. In the embodiment shown in FIG. 10, the mold 200 is a clam-shell type mold which may comprise a first mold half 204 and a second mold half 202. In one embodiment, the first mold half 204 and the second mold half 202 may be pivotally attached to one another such that the first mold half 202 may be selectively engaged with the second mold half 204. Each of the first mold half 204 and the second mold half 202 may comprise one or more vacuum ports (not shown) which may be used to retain a panel substrate and a skin layer in each mold half during the forming operation.

To form the finish panel, the panel substrate 103 is positioned in the first mold half 204 and the upper skin 102A and the lower skin 102B are positioned in the second mold half 202 following seaming, as described above. The upper skin 102A and the lower skin 102B are positioned in the second mold half such that the A-surface of each piece of skin faces the second mold half 202. The first mold half 204 and the second mold half 202 are then engaged with one another such that the B-surface of each piece of skin faces the panel substrate 103 positioned in the first mold half 204, as shown in FIG. 10.

When the first mold half 204 and the second mold half 202 are engaged with one another, as shown in FIG. 10, the seam 140 between the upper skin 102A and the lower skin 102B is at least partially disposed over the inclined portion 118 of the panel substrate 103. More particularly, when the seam 140 comprises a skin lock 110 and an overlap seam 129, as described hereinabove, and the sealing surface 124 of the panel substrate 103 comprises an upper sealing surface 116 and a lower sealing surface 114, the skin lock 110 is at least partially disposed over the inclined portion 118. In this embodiment, the upper skin 102A and the lower skin 102B transition out of the skin lock 110 along the inclined portion 118 and into an overlap seam, as shown in FIG. 10, with the B-surface of the upper skin 102A overlapping the A-surface of the lower skin 102B. The overlap seam between the upper skin 102A and the lower skin 102B is positioned in the pocket 112 such that lower skin 102B is positioned on the lower sealing surface 114, as shown in FIG. 5, such that there are no obtrusions in the A-surface of the upper skin 102A in the area of the overlap seam 129.

Further, where the seam between the upper skin 102A and the lower skin 102B further comprises an edge-on-edge seam 126, the upper skin 102A and the lower skin 102B may transition out of the overlap seam at the back wall 117 of the pocket 112, as shown in FIG. 10, and form an edge-on-edge seam 126 which is positioned on the upper sealing surface 116 of the panel substrate 103, as depicted in FIG. 4.

While specific reference is made herein to the upper skin 102A and the lower skin 102B being joined at a seam comprising a skin lock, an overlap seam and a edge-on-edge seam, it should be understood that the upper skin 102A and the lower skin 102B may be joined using various other combinations of types of seams, as described above. However, it should be understood that the portion of the seam 140 which is disposed over the sealing surface 124 may not comprise a skin lock 110. Further, it should be understood that, when the portion of the seam 140 disposed over the sealing surface 124 only comprises an edge-on-edge seam 120, as shown in FIG. 4, the sealing surface 124 does not comprise an upper sealing surface 116 and a lower sealing surface 114 as it is unnecessary to accommodate the increased thickness of an overlap seam.

Still referring to FIGS. 3-10, with the upper skin 102A and the lower skin 102B disposed over the panel substrate, sealing pressure P is exerted on the first mold half 204 and/or the second mold half 202 such that the upper skin 102A and the lower skin 102B are selectively sealed to the panel substrate 103. For example, as shown in FIGS. 3, 6 and 10, the upper skin 102A and the lower skin 102B may be sealed to the vertex 120 of the inclined portion 118 before the inclined portion 118 transitions to the sealing surface 124 as pressure is applied to the mold 200 thereby creating a zero-gap between the overlap seam and the inclined portion 118 (e.g., a zero-gap between upper skin 102A, lower skin 102B and the inclined portion 118). Similarly, the lower skin 102B and the upper skin 102A are sealed to the panel substrate 103 at the lower sealing surface 114 (e.g., in the area of the overlap seam, as shown in FIGS. 3, 5 and 10) and the upper sealing surface 116 (e.g., in the area of the edge-on-edge seam, as shown in FIGS. 3, 4 and 10).

Once the upper skin 102A and the lower skin 102B are sealed to the substrate, a foaming material may be injected between the skin layer 102 and the panel substrate 103. The foam flows between the skin layer 102 and the panel substrate and fills the area between the skin layer 102 and the panel substrate thereby forming the foam layer 104. In the area of the inclined portion 118, the shape and orientation of the inclined portion 118 relative to the base portion 142 and the sealing surface 124 reduces the amount of foam flowing upwards, towards the B-surface 108B of the lower skin 102B. Accordingly, the portion of the foam layer 104 formed along the inclined portion 118 (shown in FIG. 3) is tapered from the base portion 142 in a direction towards the vertex 120 of the inclined portion. Further, because the upper skin 102A and the lower skin 102B are sealed to the vertex 120 of the inclined portion 118 forming a zero-gap between the skin layer 102 and the inclined portion 118, foaming material is prevented from flowing to the sealing surface 124 and, as such, foam leakage at the sealing surface 124 is mitigated.

Referring now to FIGS. 7 and 10, as described above, the inclined portion 118 of the panel substrate 103 may be disposed between sidewalls 132, 134 thereby forming a channel 130 which is shown in cross section in FIG. 7. While the channel 130 encloses the skin lock 110, the channel 130 also serves to reduce the amount of foam flow to the sealing surface 124 of the panel substrate in the area of the seam 140. Specifically, the channel 130 in conjunction with the skin lock 110 inhibit the flow of foam to the sealing surface 124 in the area of the seam 140 by reducing the area through which the foam may flow to the sealing surface 124 in the area of the seam 140.

After the foam is injected between the skin layer 102 and the panel substrate 103, the foam is cured to form the foam layer 104. Thereafter, the upper skin 102A, lower skin 102B, panel substrate 103 and foam layer 104, now collectively finish panel 100, are removed from the mold for installation in a vehicle.

While specific examples shown and described herein refer to the finish panel as an instrument panel for vehicle, it should be understood that the panel substrates having the features described herein may be used to form other finish panels including, without limitation, door panels, arm rests, consoles and the like, where the finish panel comprises a panel substrate, at least two pieced of skin join together at a seam, and a foam layer.

Further, it should be understood that the panel substrates described herein restrict the flow of foam to the B-surface of the skin layers disposed over the panel substrate in the area of a seam and, as such, reduce or mitigate foam leakage from the substrate. Accordingly, it will be understood that the panel substrates described herein assist in reducing material waste by reducing the amount of material that is scrapped due to foam leakage.

For purposes of describing and defining the present invention it is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A panel substrate for an interior finish panel of a vehicle comprising a base portion, an inclined portion, an upper sealing surface, and a lower sealing surface, wherein:
   the upper sealing surface and the lower sealing surface are non-coplanar;
   the inclined portion is disposed between the base portion and the lower sealing surface forming a graded transition between the base portion and the lower sealing surface such that the lower sealing surface and the base portion are non-coplanar; and
   the inclined portion and the lower sealing surface form a vertex where the inclined portion and the lower sealing surface intersect wherein, when a skin layer comprising an upper skin and a lower skin is disposed over the panel substrate, the skin layer is sealed to the vertex, the upper skin and the lower skin are sealed to the upper sealing surface, one of the upper skin or the lower skin is sealed to the lower sealing surface and, when a foam layer is disposed between the skin layer and the panel substrate, the foam layer tapers between the base portion and the vertex.

2. The panel substrate of claim 1 wherein:
   the inclined portion is at least partially disposed between a first sidewall and a second sidewall; and
   the first sidewall, the second sidewall and the inclined portion form a channel.

3. The panel substrate of claim 1 wherein the lower sealing surface is disposed between a first sidewall and a second sidewall.

4. The panel substrate of claim 3 wherein the lower sealing surface is further bounded by a back wall which extends between the first sidewall and the second sidewall.

5. The panel substrate of claim 1 wherein the upper sealing surface and the lower sealing surface are substantially parallel.

6. The panel substrate of claim 1 wherein an angle between the inclined portion and the base portion is greater than about 90°.

7. The panel substrate of claim 1 wherein an angle between the inclined portion and the at least one sealing surface is greater than about 90°.

8. The panel substrate of claim 1 wherein the at least one sealing surface and the base portion are substantially parallel.

9. An interior finish panel for a vehicle comprising a panel substrate, at least two pieces of skin disposed over the panel substrate, and a foam layer wherein:
   the panel substrate comprises an upper sealing surface and a lower sealing surface that are non-coplanar and an inclined portion disposed between a base portion and the lower sealing surface;
   the at least two pieces of skin comprise an upper skin and a lower skin joined together at a seam to form a skin layer, wherein the upper skin and the lower skin are sealed to the upper sealing surface, one of the upper skin or the lower skin is sealed to the lower sealing surface, and the seam is at least partially disposed over the inclined portion and the seam is sealed to a vertex of the inclined portion between the inclined portion and the lower sealing surface; and
   the foam layer is disposed between the skin layer and the panel substrate, the foam layer tapering from the base portion towards the vertex of the inclined portion and terminating along the inclined portion before the vertex of the inclined portion.

10. The panel substrate of claim 9 wherein:
the inclined portion is at least partially disposed between a first sidewall and a second sidewall; and
the first sidewall, the second sidewall and the inclined portion form a channel.

11. The panel substrate of claim 10 wherein:
an angle between the inclined portion and the base portion is greater than about 90°;
an angle between the inclined portion and the at least one sealing surface is greater than about 90°; and
the at least one sealing surface and the base portion are substantially parallel.

12. The interior finish panel of claim 9 wherein the seam comprises a skin lock portion and an overlap portion, wherein:
the skin lock portion is disposed over the base portion of the panel substrate;
the skin lock portion transitions into the overlap portion along the inclined portion; and
the overlap portion is sealed to the vertex of the inclined portion.

13. The interior finish panel of claim 12 wherein the lower sealing surface is positioned between the vertex of the inclined portion and the upper sealing surface and the overlap portion is positioned on the lower sealing surface.

14. The interior finish panel of claim 13 wherein the lower sealing surface is positioned between a first sidewall and a second sidewall.

15. The interior finish panel of claim 13 wherein the seam further comprises an edge-on-edge portion and the overlap portion transitions to the edge-on-edge portion at the upper sealing surface and the edge-on-edge portion is positioned on the upper sealing surface.

16. A method for forming a finish panel for a vehicle comprising a panel substrate, at least two pieces of skin disposed over the panel substrate, and a foam layer positioned between the panel substrate and the at least two pieces of skin, the method comprising:
providing a panel substrate comprising an upper sealing surface and a lower sealing surface that are non-coplanar and an inclined portion positioned between a base portion and the lower sealing surface;
positioning the panel substrate in a first mold half;
providing an upper skin and a lower skin with a seam disposed between the upper skin and the lower skin;
positioning the upper skin and the lower skin in a second mold half;
engaging the first mold half with the second mold half such that the upper skin and the lower skin are disposed over the panel substrate and at least a portion of the seam is positioned over the inclined portion of the panel substrate such that the upper skin and the lower skin are sealed to the upper sealing surface, one of the upper skin or the lower skin is sealed to the lower sealing surface, and the seam formed by the upper skin and the lower skin is sealed to a vertex of the inclined portion and the lower sealing surface; and
injecting a foaming material between the panel substrate and the upper skin and the lower skin to form the foam layer.

17. The method of claim 16 wherein:
the inclined portion of the panel substrate is at least partially disposed between a first sidewall and a second sidewall; and
the first sidewall, the second sidewall and the inclined portion form a channel.

18. The method of claim 16 wherein the seam between the upper skin and the lower skin comprises a skin lock portion and an overlap portion, wherein:
the skin lock portion is disposed over the base portion of the panel substrate;
the skin lock portion transitions into the overlap portion along the inclined portion; and
the overlap portion is sealed to the vertex of the inclined portion when the first mold half is engaged with the second mold half.

19. The interior finish panel of claim 18 wherein:
the lower sealing surface is positioned between the vertex of the inclined portion and the upper sealing surface and the overlap portion is positioned on the lower sealing surface; and
the seam further comprises an edge-on-edge portion and the overlap portion transitions to the edge-on-edge portion at the upper sealing surface and the edge-on-edge portion is positioned on the upper sealing surface.

* * * * *

UNITED STATES PATENT AND TRADEMARK OFFICE
CERTIFICATE OF CORRECTION

PATENT NO. : 8,276,978 B2  Page 1 of 1
APPLICATION NO. : 12/427220
DATED : October 2, 2012
INVENTOR(S) : Stachura et al.

It is certified that error appears in the above-identified patent and that said Letters Patent is hereby corrected as shown below:

Claim 11, column 11, line 9, change "substrate of claim 10 wherein:" to "substrate of claim 9 wherein:"

Signed and Sealed this
Thirteenth Day of November, 2012

David J. Kappos
*Director of the United States Patent and Trademark Office*